(12) United States Patent
Denoue et al.

(10) Patent No.: US 7,343,552 B2
(45) Date of Patent: Mar. 11, 2008

(54) SYSTEMS AND METHODS FOR FREEFORM ANNOTATIONS

(75) Inventors: Laurent Denoue, Palo Alto, CA (US); Gene Golovchinsky, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 389 days.

(21) Appl. No.: 10/777,352

(22) Filed: Feb. 12, 2004

(65) Prior Publication Data

US 2005/0183005 A1 Aug. 18, 2005

(51) Int. Cl.
*G06F 15/00* (2006.01)

(52) U.S. Cl. .................................... 715/512

(58) Field of Classification Search .......... 715/512, 715/541, 500; 345/179; 382/188
See application file for complete search history.

(56) References Cited

U.S. PATENT DOCUMENTS

| | | | | |
|---|---|---|---|---|
| 6,279,014 | B1 * | 8/2001 | Schilit et al. | 715/512 |
| 6,389,435 | B1 * | 5/2002 | Golovchinsky et al. | 715/512 |
| 6,766,494 | B1 * | 7/2004 | Price et al. | 715/513 |
| 6,917,965 | B2 * | 7/2005 | Gupta et al. | 709/206 |
| 7,003,308 | B1 * | 2/2006 | Fuoss et al. | 455/466 |
| 7,028,256 | B2 * | 4/2006 | Altman et al. | 715/518 |
| 7,218,783 | B2 * | 5/2007 | Bargeron et al. | 382/188 |
| 2002/0030683 | A1 * | 3/2002 | Alexander | 345/440.1 |
| 2003/0050927 | A1 * | 3/2003 | Hussam | 707/5 |
| 2003/0070139 | A1 * | 4/2003 | Marshall et al. | 715/512 |
| 2003/0145310 | A1 * | 7/2003 | Thames et al. | 717/123 |
| 2004/0034835 | A1 * | 2/2004 | Kuruoglu et al. | 715/530 |
| 2004/0078757 | A1 * | 4/2004 | Golovchinsky et al. | 715/512 |
| 2004/0194021 | A1 * | 9/2004 | Marshall et al. | 715/512 |
| 2004/0199516 | A1 * | 10/2004 | Thames et al. | 707/100 |
| 2004/0201633 | A1 * | 10/2004 | Barsness et al. | 345/864 |
| 2004/0205542 | A1 * | 10/2004 | Bargeron et al. | 715/512 |
| 2004/0205545 | A1 * | 10/2004 | Bargeron et al. | 715/512 |
| 2004/0205547 | A1 * | 10/2004 | Feldt et al. | 715/512 |

(Continued)

OTHER PUBLICATIONS

Bargeron et al., Reflowing Digital Ink Annotations, ACM 2003, pp. 385-392.*

(Continued)

*Primary Examiner*—Cong-Lac Huynh
(74) *Attorney, Agent, or Firm*—Fliesler Meyer LLP

(57) ABSTRACT

Systems and methods in accordance with the present invention provide freeform annotation techniques designed to make freeform annotations on a digital document more flexible, reliable and presentable on a screen of a computing device. They allow users to markup the document, add comments, and link between annotations, while maintaining the freeform nature of these annotations without constraining the kinds of annotations allowed. These freeform annotations are then unequivocally recognized via a state machine into three groups of annotation marks: anchor, comment, and link, each of which is associated with either part of the digital document or with another annotation mark. In addition, these annotation marks can be repositioned and resized to fit within the display area available on the screen based on the display properties of the screen, thus supporting the natural flow of annotating the document in a freeform manner. This description is not intended to be a complete description of, or limit the scope of, the invention. Other features, aspects, and objects of the invention can be obtained from a review of the specification, the figures, and the claims.

60 Claims, 7 Drawing Sheets

U.S. PATENT DOCUMENTS

| | | | |
|---|---|---|---|
| 2004/0243552 A1* | 12/2004 | Titemore et al. | 707/3 |
| 2004/0252888 A1* | 12/2004 | Bargeron et al. | 382/188 |
| 2004/0255242 A1* | 12/2004 | Price et al. | 715/512 |
| 2004/0268253 A1* | 12/2004 | DeMello et al. | 715/526 |
| 2005/0091027 A1* | 4/2005 | Zaher et al. | 703/22 |
| 2005/0108001 A1* | 5/2005 | Aarskog | 704/10 |
| 2005/0134606 A1* | 6/2005 | Hong et al. | 345/619 |
| 2005/0138541 A1* | 6/2005 | Euchner et al. | 715/512 |
| 2005/0209989 A1* | 9/2005 | Albornoz et al. | 707/1 |
| 2005/0289452 A1* | 12/2005 | Kashi et al. | 715/512 |
| 2006/0048047 A1* | 3/2006 | Tao | 715/512 |
| 2006/0050969 A1* | 3/2006 | Shilman et al. | 382/224 |
| 2006/0080598 A1* | 4/2006 | Bargeron et al. | 715/512 |
| 2006/0143559 A1* | 6/2006 | Spielberg et al. | 715/512 |
| 2006/0218171 A1* | 9/2006 | Wakeam et al. | 707/101 |
| 2006/0224610 A1* | 10/2006 | Wakeam et al. | 707/101 |
| 2007/0118794 A1* | 5/2007 | Hollander et al. | 715/512 |

OTHER PUBLICATIONS

Golovchinsky et al., Hypertext Interaction Revisited, ACM 2000, pp. 171-179.*

Golovchinsky et al., Moving Markup: Repositioning Freeform Annotations, ACM 2002, pp. 21-29.*

Gotze et al., The Intelligent Pen—Toward a Uniform Treatment of Electronic Documents, ACM 2002, pp. 129-135.*

* cited by examiner

```
function INITIALIZATION()
{
        int state = FIRST_STROKE;
        anchors = {};
        links = {};
        comments = {};
} function RECOGNIZE(Stroke s)
{
        switch (state)
        {
                case FIRST_STROKE OR ANCHORING:
                        if (s starts on anchor and s ends on anchor) then
                                links += s
                                state = ANCHORING
                        elseif (s is underline or highlight or margin_bar) then
                                anchors += s
                                state = ANCHORING
                        else
                                if (state == FIRST_STROKE) then
                                        show s as unrecognized
                                else
                                        state = COMMENTING
                                        current_comment += s
                                        show button (user preferences)
                                endif
                case COMMENTING:
                        if (s is exiting_commenting_mode_stroke) then
                                comments += current_comment;
                                if user chosed freeform pasting then
                                        state = FREEFORM_PASTING
                                else
                                        state = FIRST_STROKE
                                endif
                        else
                                current_comment += s;
                        endif
                case FREEFORM_PASTING:
                        reposition current_comment along s;
                        state = FIRST_STROKE;
        }
}
```

*Figure 3*

'e media, immersive conferencing, adaptive computing, natural language
impact of technology on communities. Our aim is to help Fuji Xerox with a
on technology infrastructure that will support services in Fuji Xerox Ope

501

:ion g to shape the future of the office and digital documents, and provide Fu

*Figure 5(a)*

'e media, immersive conferencing, adaptive computing, natural language
impact of technology on communities. Our aim is to help Fuji Xerox with a
on technology infrastructure that will support services in Fuji Xerox Oper

502 ion g to shape the future of the office and digital documents, and provide Fu
nformation technology base for the 21st century. This goal is accomplishe

*Figure 5(b)* ive media, immersive conferencing, adaptive computing, natural languag
 impact of technology on communities. Our aim is to help Fuji Xerox witl
:ion technology infrastructure that will support services in Fuji Xerox O sion    503 ng to shape the future of the office and digital documents, and provide

*Figure 5(c)*

'e media, immersive conferencing, adaptive computing, natural language
impact of technology on communities. Our aim is to help Fuji Xerox with a
on technology infrastructure that will support services in Fuji Xerox Ope :ion

504 g to shape the future of the office and digital documents, and provide Fu

*Figure 5(d)* ierations in the fast-growing Asian and Southern Pacific regions.
ractive media, immersive conferencing, adaptive computing, natu
d the impact of technology on communities. Our aim is to help Fu
rmation technology infrastructure that will support services in Fu
ntier.                601

Mission

Figure 6

Name: Laurent Denoue, born July 29, 1972 in Aix-Les-Bains (France)

Summary: After completing my PhD at Syscom (University of Savoie) where I was working with Laurence Vignollet on Web annotation systems and using annotations to improve personal information organization, I moved to FXPAL where I am still working on annotation systems, but for electronic books and freeform annotations (how to reposition them when the layout changes or the content changes). 704

701

I am currently working on Shared Text-input. The system 703 was designed to facilitate text-entry on small devices like PDAs: users can shared their 702a notes in real-time during a meeting or in the classroom, 702b

*Figure 7*

SYSTEMS AND METHODS FOR FREEFORM ANNOTATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present disclosure relates to the input, processing and display of freeform annotations.

BACKGROUND

Freeform annotations are ink-based strokes, gestures, or handwritings of any shape that a user can input to a computing device using an associated input device, which can be but is not limited to, a mouse, a keyboard, and a stylus. Here a computing device can be but is not limited to, a PDA, a Tablet PC, a Pocket PC, a cell phone, an electronic messaging device, a Java-enabled device, a laptop or desktop PC, a workstation, and a mainframe computer. The processing unit inside the computing device can be a CPU, an embedded CPU, or a Micro Control Unit (MCU). Freeform annotation systems have been pursued since, unlike text-based annotation systems that do not support natural annotation as on paper, they provide a natural way to annotate digital documents, which is especially important for portable computing devices such as: PDA, Pocket PC or cell phone. A digital document can be stored either in memory or on a persistent storage (e.g., hard drive) associated with the computing device, and it can include at least one of: a text file, an image, a figure, a drawing, a graph, a picture, and a video clip.

Previous approaches to freeform annotation systems suffer from two major drawbacks: First, they often limit the kind of annotations that can be recognized and put restrictions on how the annotations can input in order to be recognized correctly, making the annotations not truly "freeform". For example, links between portions of a displayed digital document are often not recognized; Secondly, they often rely on heuristic techniques to automatically group individual annotations into various categories. Due to their heuristic nature, these techniques do not work all the time.

The situation is further complicated when the digital document is viewed on different display devices or when users select different font sizes, requiring the annotations on the document to be repositioned or resized according to the display properties of a specific display device in order to be rendered properly. Here a display device can be a screen, which can be a LCD or a CRT monitor having a display area of certain width and height measured in terms of number of pixels; A display property can be associated with one of: a text font, a font size, a text color, a display width, height, and resolution of the display device. Text-based annotation systems can provide an obvious place or a special text box to input annotations, making rendering of the annotations a straightforward task. Freeform annotation systems, however, require that the annotations to be linked to a portion of the digital document for proper rendering. In addition, certain freeform annotations, such as comments, have to be sized down from handwriting sizes in order to fit within the often limited blank area available on a display device, such as the screen of a PDA.

BRIEF DESCRIPTION OF THE DRAWINGS

FIG. 3 is an illustration of an exemplary code of an algorithm implementing a state machine in accordance to one embodiment of the invention.

FIGS. 5(a)-(d) are illustrations of methods marking the completion of a comment in accordance to one embodiment of the invention.

FIG. 6 is an illustration of the rendering of a comment in accordance to one embodiment of the invention.

FIG. 7 is an illustration of resizing and repositioning of exemplary freeform annotations in accordance to one embodiment of the invention.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Systems and methods in accordance with the present invention provide freeform annotation techniques designed to make freeform annotations on a digital document more flexible, reliable and presentable on a screen of a computing device. They allow users to markup the document, add comments, and link between annotations, while maintaining the freeform nature of these annotations without constraining the kinds of annotations allowed. These freeform annotations are then unequivocally recognized via a state machine into three groups of annotation marks: anchor, comment, and link, each of which is associated with either a portion of the digital document or with another annotation mark. In addition, these annotation marks can be repositioned and resized to fit within the blank area available on the screen based on the display properties of the screen, thus supporting the natural flow of annotating the document in a freeform manner. The software used in the system can be implemented in one or more of the following programming languages: C, C++, Visual Basic, Java and Java Applet.

Figure 1:
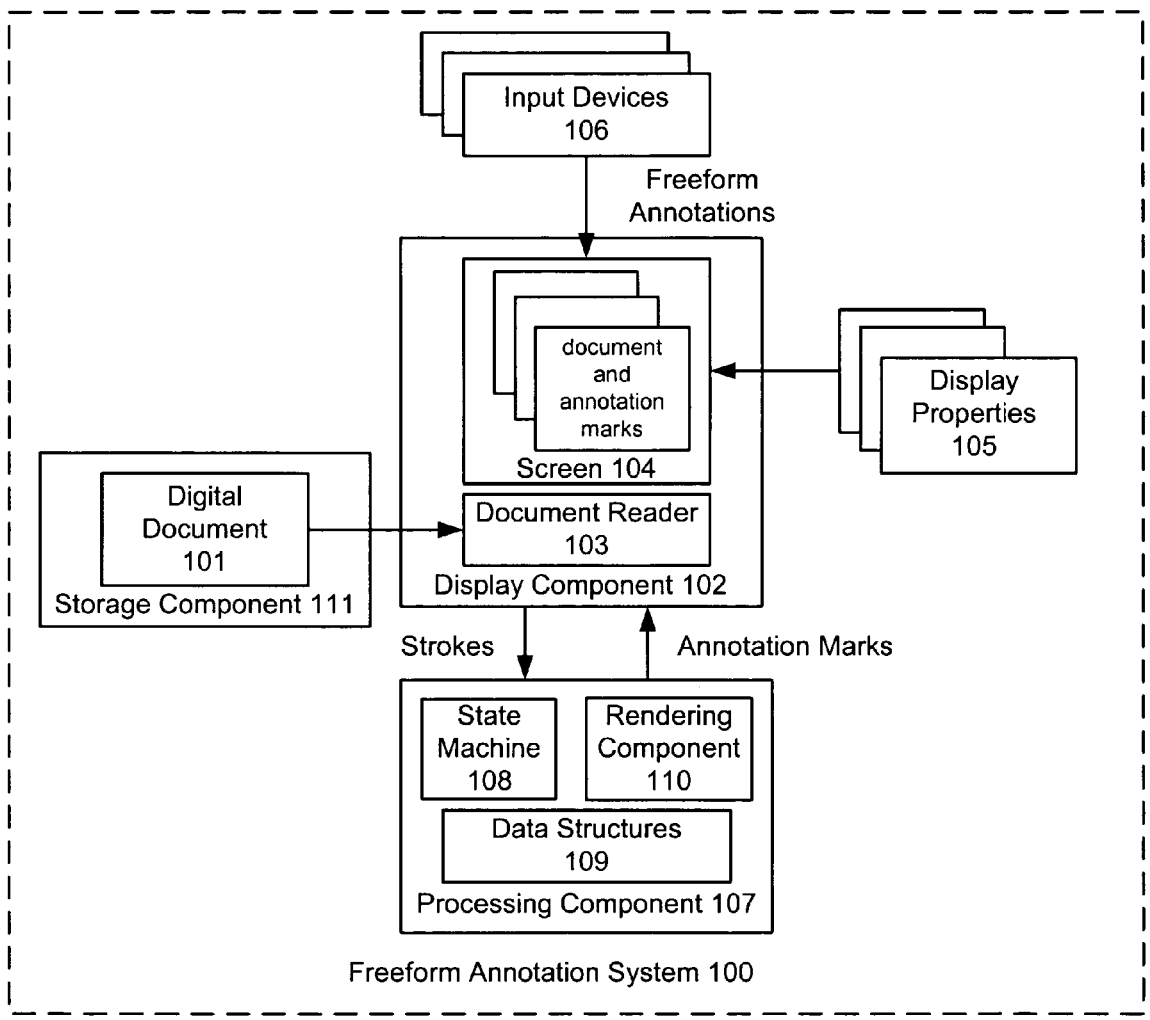
FIG. 1 is an illustration of an exemplary freeform annotation system in accordance to one embodiment of the invention.

FIG. 1 is an illustration of an exemplary freeform annotation system in an embodiment of the present invention. Although this diagram depicts objects/processes as logically separate, such depiction is merely for illustrative purposes. It will be apparent to those skilled in the art that the objects/processes portrayed in this figure can be arbitrarily combined or divided into separate software, firmware and/or hardware components. Furthermore, it will also be apparent to those skilled in the art that such objects/processes, regardless of how they are combined or divided, can execute on the same computing device or can be distributed among different computing devices connected by one or more networks or other suitable communication means.

Within the exemplary freeform annotation system 100 in FIG. 1, a digital document 101 can be stored in a storage component 111 either in memory or on a persistent storage in a computing device. A display component 102 reads a portion of the digital document through a document reader 103 and display it on its screen 104 based on the display properties 105 of the screen. A user can mark and comment on the displayed portion of the digital document using freeform annotations via one or more input devices 106. A processing component 107 then accepts and interprets these freeform annotations using a state machine 108 and generates three categories of annotation marks. The state machine is completely deterministic, i.e., it can always unequivocally recognize and characterize those freeform annotations. These generated annotation marks are associated with the corresponding portions of displayed document, and can be selected, moved, modified and deleted. They can be stored in various kinds of data structures 109, either in memory or in persistent storage. Furthermore, they can be repositioned, resized and rendered for display by a rendering component 110 based on the display properties of the screen.

In one embodiment, the document reader 103 needs to have access to the bounding boxes of all words and images in the portion of the digital document under display. An application implemented as a Java applet is developed that accepts an URL and the width of the screen for display, e.g. 800 pixels for a desktop, 240 pixels for a Pocket PC screen, It returns an image of a Web page rendered at the specified width, and also a file containing the bounding boxes of all elements on that page. By changing the width, the application can easily generate layouts that are adapted to different screen sizes.

In one embodiment, the Microsoft Internet Explorer control can be used by the application to render the Web page by capturing its rendition, and the Document Object Model can also be accessed to read the bounding box information. This information is then used by the application to display the rendered image, making it suitable for annotating Web pages on any Java-enabled device like most laptops and PDAs.

In one embodiment, the processing component 107 recognizes and characterizes annotation marks into three groups:

Anchors, which include: highlights, underlines, margin bars, circled words, circled areas, brackets, etc. An anchor can identify a part of the portion of the digital document under display to which a comment might eventually be attached;

Comments, which are usually handwritten notes. Comments are often written in a margin on the document, but are more generally written on a blank area of the document where there is space to write;

Links, which include connectors and arrows. A link can link between anchors, anchors and comments, or multiple comments.

Figure 2:
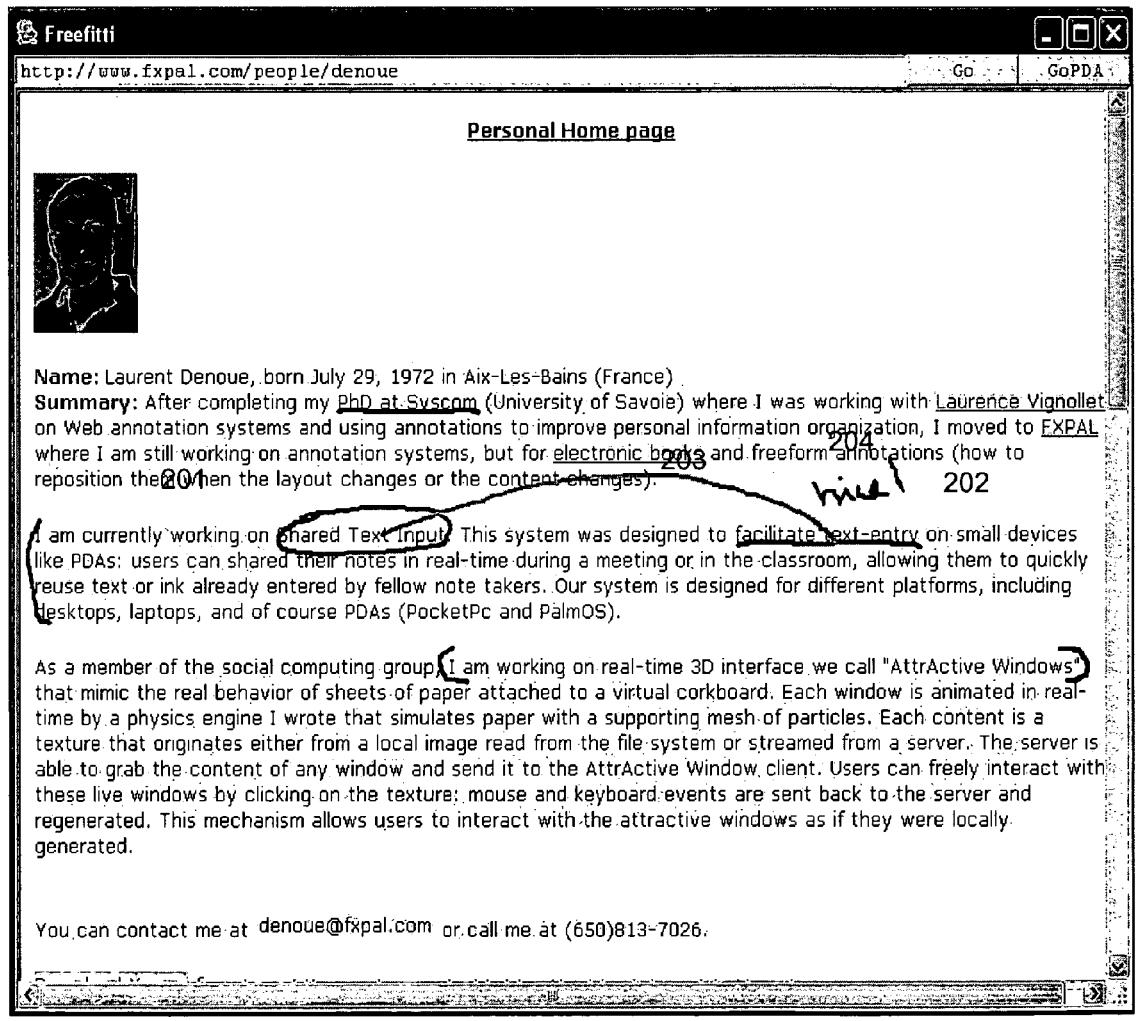
FIG. 2 is an illustration of exemplary freeform annotations in accordance to one embodiment of the invention.

FIG. 2 shows a portion of a Web page displayed with anchors 201 and 202, a link 203, and a comment 204, all can be marked in any color.

In one embodiment, the state machine 108 in the processing component is designed to recognize the natural flow of freeform annotations on a digital document under display, creating anchors, adding comments, and creating links. FIG. 3 is an exemplary source code illustrating an algorithm implementing the state machine in accordance to one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 3, the state is initially set to FIRST_STROKE. In this state, the state machine always tries to interpret a stroke as an anchor or a link. When a stroke has successfully been recognized as an anchor or a link between two existing anchors, the state goes to ANCHORING.

While in the ANCHORING state, the state machine first tries to interpret a stroke as an anchor or a link. If the stroke is not recognized as an anchor or a link (e.g. the stroke starts on an blank area of the document), then the state switches to COMMENTING and the stroke is added to a new comment (where a comment is a collection of strokes).

While in the COMMENTING state, the state machine tries to interpret if the stroke indicates exiting the commenting mode. If not, the stroke gets added to the same comment (i.e. same collection of strokes). However, if the system has detected that the stroke indicates exiting the commenting mode (e.g. clicking on a button, a special gesture, and other indications as discussed later), then the state can switch back to FIRST_STROKE or FREEFORM_PASTING, depending on user preferences.

In FREEFORM_PASTING state, users can input one more stroke that specify where and how the newly created collection of strokes (i.e., current comment) should be rendered. After that stroke is input, the state goes back to FIRST_STROKE.

When a stroke is finished, the state machine tries to interpret it as follows (401-404 shown in FIG. 4 correspond to 201-204 in FIG. 2, respectively):

If the stroke intersects a word or an image, then it is interpreted as an anchor 401 or 402. The bounding boxes of the words that have been identified by this anchor are displayed, providing a useful feedback to the user.

If the stroke does not intersect any word or image, it is interpreted as a comment 404. The state machine switches to the COMMENTING state and the strokes are added to the comment.

Figure 4:
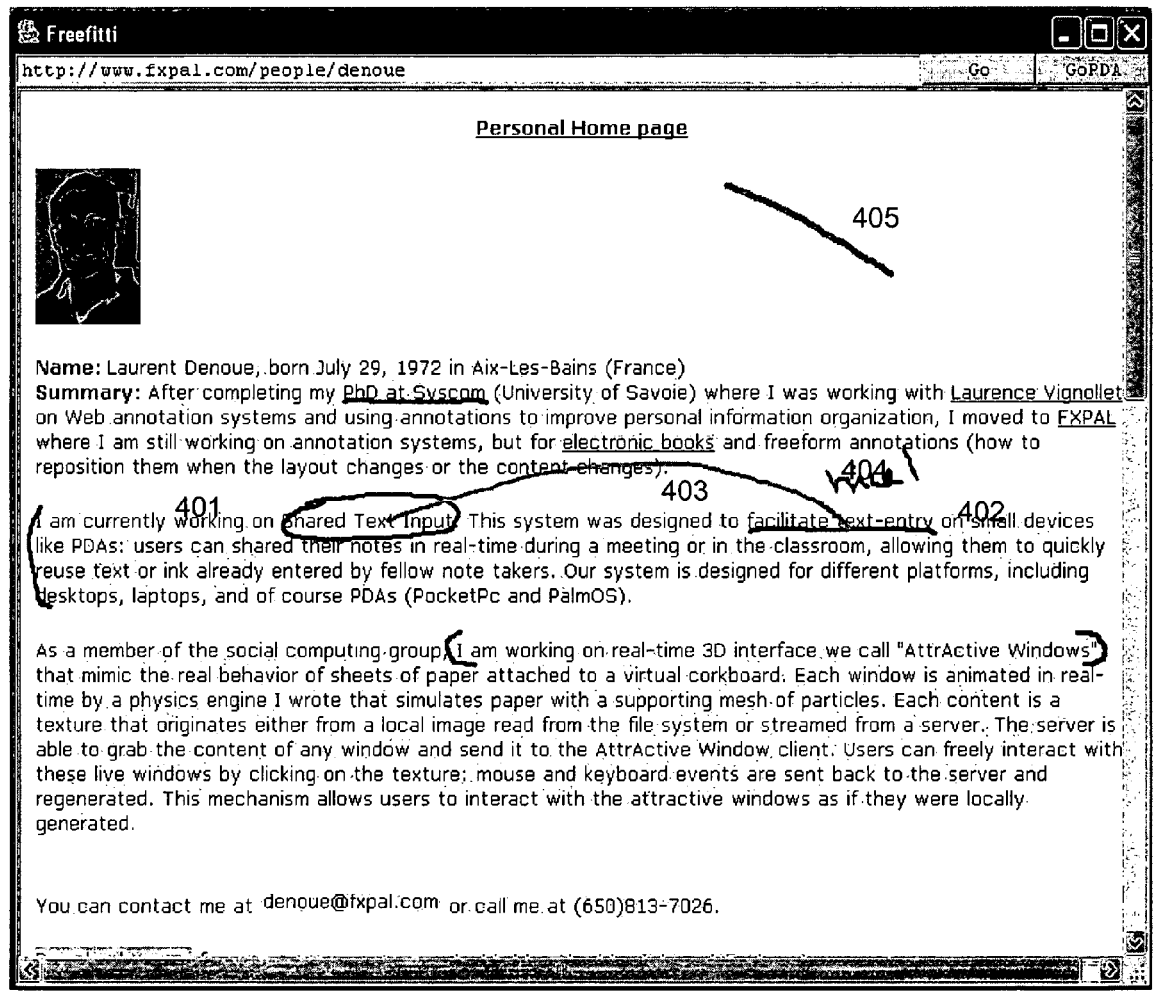
FIG. 4 is an illustration of an exemplary misplaced freeform annotation in accordance to one embodiment of the invention.

If the stroke 405 does not overlap with any word or image while in the ANCHORING state, the system redraws it in a distinctive color, to indicate that it did not recognize it, as shown in FIG. 4. Unrecognized marks disappear after a little while.

A link 403 is detected if the origin and the destination of the stroke overlap an existing anchor or comment.

The algorithm above can make sure that the state machine is always able to unequivocally group strokes properly by adopting the following rules:

Strokes making a comment are assembled into a single comment (collection of strokes) and labeled as such;

A comment is always linked to an anchor or a link (i.e., the stroke that was created right before the comment started);

An anchor is always linked to a specific part of the displayed portion of the digital document; and A link always identifies two existing anchors.

In one embodiment, several approaches can be adopted by the state machine to accurately recognize when the user has finished commenting, these approaches can include:

Clicking on a pre-defined area of the screen, for example, a button 501 that is displayed next to the first stroke of the comment, as shown in FIG. 5(a).

Selecting the commenting strokes with a circular gesture 502 that includes most of the strokes input since the comment was started, as shown in FIG. 5(*b*).

Selecting the commenting strokes with a strike-through gesture 503, as shown in FIG. 5(*c*).

Drawing a stroke 504 that bounces off at the bottom of the screen, as shown in FIG. 5(*d*).

Using a special gesture that is preferably rare in common handwriting, so that the state machine does not exit the COMMENTING state inappropriately.

Drawing a vertical stroke on the left or right of the commenting strokes.

Etc.

After one of these approaches is taken, the state machine can either directly switch back to ANCHORING state or, depending on user preferences or the method chosen to end the COMMENTING state, the state machine can also go to the FREEFORM_PASTING state. In the later case, users can input another stroke to specify how and where the comment should be rendered in the document. As shown in FIG. 6, the user specifies such a stroke 601 and the state machine renders the comment along the stroke. Being able to specify where and how the comment is pasted is useful on PDAs where users are forced to write big.

In one embodiment, areas are reserved on the screen for the user to input freeform annotations. It often happens that the screen displaying a portion of the digital document might be so crowded on that it might be difficult for the user to find a blank area from where he/she can start commenting. In one approach, left and right margins are created automatically so that users can always (and predictably) find a blank area. This feature is very important when the page is accessed from a PDA because the image might not be displayed at original captured scaled, but zoomed out a little bit to prevent too much panning. In another approach, blank areas are visually made salient from the bounding boxes of the text and images, helping users know where they can ink to switch to commenting. Yet in another approach, an area (e.g. a button) is defined on the screen where users can click to specifically start commenting.

In one embodiment, the state machine is capable of identifying the following anchor types by recognizing:

Circled words/areas: end point of stroke near start of stroke.

Highlights/underlines: the width of bounding box is at least three times larger than its height.

Margin bars: height is at least three times larger than its width.

If a stroke does not fall within these types, the rendering component 110 indicates the mis-recognition by redrawing the stroke in a distinctive color and then erases it. When the stroke is recognized as one type of the anchor, the rendering component then associates some document content to that anchor as follows:

Highlights/underlines: the words that are closest to the stroke.

Margin bars: the word range, where the first word being the word closest to the top of the stroke, the last word being the last word on the line aligned vertically with the bottom of the stroke.

Circles words/areas: the word that is closest to the center of the bounding box of the stroke.

In one embodiment, annotation marks are stored in the following types of data structures 109 once they are recognized, either in memory or on a persistent storage:

Anchor: author, time, URL, anchor stroke, text selected by the anchor stroke, height of the text selected by the stroke.

Comment: author, time, URL, comment stroke, anchor.

Link: author, time, URL, link stroke, first anchor or comment, second anchor or comment (optional).

Here, a stroke can represent a collection of ink segments. When the user starts entering a comment, all strokes that are input are grouped together into the same stroke. The point coordinates are stored as (x, y) coordinates, and a break is represented by a (−1, −1).

In one embodiment, users might want to see the links between a specific comment and its associated anchor, or the anchors linked by a connector. At any time, users can tap and hold (mouse over with a mouse) over a stroke: the rendering component automatically highlights the corresponding objects. Since annotations can be created by different authors, re-coloring or other highlighting procedures can be used by the rendering component to show all annotations made by a specific person or at a particular time/data.

In one embodiment, annotation marks can be selected and modified in one of the following steps:

Adding text to an existing comment: tapping, holding, and lifting stylus (or mouse up) on top of an existing comment allow users to add more strokes to this comment. On a PDA, comment strokes are zoomed in back to their original size to allow comfortable handwriting.

Moving/delete anchors, links, comments: tapping, holding and dragging allow users to move/delete anchors. When an anchor is deleted, its associated comment and/or connector is also removed.

Once the processing component understands anchors, links and comments, the rendering component 110 is able to correctly reposition and resize annotations when the document layout changes, as it often happens. Being able to correctly categorize marks into these three groups becomes even more important on small screens such as PDAs: users need to write much bigger and the rendering component might want to automatically scale down the comment once finished. It is also important when users start sharing their annotations because they want to make sure that the system will correctly reposition their annotations when the same document is displayed on their colleagues' display components having different display properties such as: screen size, font size, etc.

In one embodiment, the rendering component in the processing component adopts an algorithm to resize and reposition anchors according to their types as follows (701-704 shown in FIG. 7 correspond to 201-204 in FIG. 2, respectively):

Circled area/word: the rendering component locates the bounding box of the word to which the anchor 201 in FIG. 2 was attached, redraws the original stroke, possibly scaled according to the size of the new bounding box of the word in the document, and reposition it on the screen, shown as 701 in FIG. 7. This is important if the user has changed the font size.

Margin bar: the rendering component locates the first and last words of the word range in the document and computes the height of the bounding box. The margin bar is scaled vertically.

Underline/highlight: the rendering component retrieves the bounding box of the word range. If the words still appear on the same line, the rendering component scales the stroke horizontally. If the words appear on different lines, the rendering component splits the mark and scale the new segment to the length of the remaining words. For example, the underline 202 in FIG. 2 is split into 702*a* and 702*b* as shown in FIG. 7.

If comments 204 in FIG. 2 were on the right of their associated anchor, the rendering component displays them on a blank area of the document located on the right of the page, shown as 704 in FIG. 7. The rendering component does the opposite if the comment was located on the left of their associated anchor. If they were above their associated anchor, the rendering component displays them above in the blank area, and vice versa if they were below their associated anchor. To minimize overlap, the rendering component repositions comments vertically so that they don't overlap previously repositioned comments. Comments are automatically scaled down when displayed on a smaller screen.

In one embodiment, a link 203 in FIG. 2 is replaced by a straight line 703 connecting the two anchors, as shown in FIG. 7. The start and end points of the line are computed once the anchors have been repositioned: they are set to the center of the bounding box of the anchor. Finer grained repositioning is possible by storing the original location of the start/end points of the links within the original anchors' bounding boxes.

When freeform pasting is not used, the rendering component can automatically scale down the commenting strokes before rendering, starting at the top/left corner of the bounding box of the original comment. This is especially useful on small screens where users are forced to write big.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "freeform annotation" is used for in the embodiments of the systems and methods described above, it will be evident that such concept can be interchangeably used with equivalent concepts such as, stroke, gesture, handwriting, mark, and other suitable concepts;. While the concept "annotation mark" is used for in the embodiments of the systems and methods described above, it will be evident that such concept can be interchangeably used with equivalent concepts such as, annotation, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method to support freeform annotations, comprising:
   (a) reading and displaying a portion of a digital document on a screen based on one or more display properties of the screen;
   (b) accepting one or more freeform annotations on the displayed portion of the digital document via one or more input devices;
   (c) categorizing a first annotation from the one or more freeform annotations where the first categorized annotation is an anchor, wherein the anchor intersects a word or an image in the digital document;
   (d) categorizing a second annotation where the second categorized annotation is selected from the group consisting of a second anchor type and a comment type, wherein the second anchor intersects a word or an image in the digital document and wherein the comment does not intersect a word or an image in the digital document;
   (e) repeating step (d) to generate a class of annotations where each categorized annotation from step (d) is a member of the class of annotations, until a categorized annotation is categorized as the second anchor type;
   (f) categorizing a further annotation where the further categorized annotation is selected from the group consisting of anchor types, comment types and connector types, wherein the anchor type intersects a word or an image in the digital document, wherein the comment does not intersect a word or an image in the digital document; wherein the connector type connects two anchor types, wherein a first connector connects two anchors;
   (g) repeating step (f) and thereby categorizing the one or more freeform annotations via a completely deterministic state machine; and
   (h) indicating to the user the outcome of the processing of the one or more free-form annotations.

2. The method according to claim 1, wherein:
   the method can be performed on one or more computing devices, wherein a computing device in the one or more computing devices can be one of: a PDA, a Tablet PC, a Pocket PC, a cell phone, an electronic messaging device, a Java-enabled device, a laptop or desktop PC, a workstation, and a mainframe computer.

3. The method according to claim 1, wherein:
   the method can be implemented in one or more of the following programming languages:
   C, C++, Visual Basic, Java and Java Applet.

4. The method according to claim 1, wherein:
   the digital document can include at least one of: a text file, an image, a figure, a drawing, a graph, a picture, and a video clip.

5. The method according to claim 1, wherein:
a display property in the one or more display properties of the screen can be associated with one of: a text font, a font size, a text color, a display width, height, and resolution of the screen.

6. The method according to claim 1, wherein:
a freeform annotation in the one or more freeform annotations can be one or more of: strokes, gestures and handwritings of any shape.

7. The method according to claim 1, wherein:
an input device in the one or more input devices can be one of: a keyboard, a mouse, and a stylus.

8. The method according to claim 1, further comprising:
storing the digital document in memory and/or in a persistent storage.

9. The method according to claim 1, wherein:
the reading and displaying step comprises at least one of:
utilizing the control of the Microsoft Internet Explorer; and
accessing the Document Object Model to obtain the bounding box of the digital document.

10. The method according to claim 1, further comprising:
reserving an area on the screen for the input of the one or more freeform annotations.

11. The method according to claim 1, further comprising:
managing one or more annotation marks on the displayed portion of the digital document by performing at least one of: creating, selecting, modifying, moving, deleting, rendering, and displaying an annotation mark of the one or more annotation marks on the screen based on the one or more display properties of the screen.

12. The method according to claim 11, wherein:
an annotation mark in the one or more annotation marks can be one of:
an anchor capable of associating with a part of the portion of the digital document;
a link capable of connecting at least two anchors; and
a comment capable of associating with either an anchor or a connector.

13. The method according to claim 12, wherein:
the anchor can be one of: an underline, a highlight, a circled word, a circled area, a bracket, and a margin bar; and
the link can be one of: an arrow, and a connector.

14. The method according to claim 11, further comprising:
storing the one or more annotation marks in memory and/or in a persistent storage.

15. The method according to claim 11, wherein:
the selecting, moving, modifying, or deleting step comprises:
tapping, holding, and lifting an input device in the one or more input devices on the annotation mark.

16. The method according to claim 11, wherein:
the rendering step comprises at least one of:
retrieving a bounding box of the annotation mark;
resizing and/or splitting the annotation mark; and
repositioning the annotation mark on the portion of the digital document under display.

17. The method according to claim 12, further comprising:
reserving an area on the screen for the rendering of the comment; and/or
resizing and/or repositioning the comment based on one of the one or more display properties.

18. The method according to claim 12, further comprising:
identifying the start of the comment by recognizing a freeform annotation in the one or more freeform annotations, wherein the freeform annotation is capable of:
starting on a blank area on the digital document under display; and/or
not intersecting with any word or image on the digital document.

19. The method according to claim 12, further comprising:
identifying the finish of the comment by recognizing a freeform annotation in the one or more freeform annotations, wherein the freeform annotation can be one of:
a click on a predefined area on the screen, which can be a button;
a circular gesture around the comment;
a strike-through gesture on the comment;
a stroke bouncing off from the bottom of the screen;
a special gesture that is rare in common handwriting; and
a vertical stroke drawn on the left or right of the comment.

20. A system to support freeform annotations, comprising:
a storage component capable of maintaining a digital document and one or more software components;
a display component capable of:
displaying a portion of the digital document based on one or more display properties of the display component; and
accepting one or more freeform annotations on the displayed portion of the digital document via one or more input devices;
a processor component capable of categorizing the one or more freeform annotations via a completely deterministic state machine;
(a) wherein the processor first categorizes a freeform annotations as a first anchor type, wherein the first anchor type intersects a word or an image in the digital document;
(b) wherein the processor next categorizes a freeform annotations as a second anchor type or a comment type, wherein the second anchor type intersects a word or an image in the digital document and wherein the comment type does not intersect a word or an image in the digital document;
(c) wherein the processor thereafter repeats step (b) unless a second anchor type is processed;
(d) wherein the processor thereafter categorizes freeform annotations as an anchor type or a comment type or a connector type, wherein the anchor type intersects a word or an image in the digital document, wherein the comment does not intersect a word or an image in the digital document; wherein the connector type connects two anchor types, wherein the first connector type connects the first anchor type and the second anchor type.

21. The system according to claim 20, wherein:
the system can be part of one or more computing devices, wherein a computing device in the one or more computing devices can be one of: a PDA, a Tablet PC, a Pocket PC, a cell phone, an electronic messaging device, a Java-enabled device, a laptop or desktop PC, a workstation, and a mainframe computer.

22. The system according to claim 20, wherein:
the storage component can be a memory or a persistent storage.

23. The system according to claim 20, wherein:
the display component can be a screen, which can be a LCD or a CRT monitor.

24. The system according to claim 20, wherein:
the processing component can be a CPU, an embedded CPU, or a MCU.

25. The system according to claim 20, wherein:
the digital document can include at least one of: a text file, an image, a figure, a drawing, a graph, a picture, and a video clip.

26. The system according to claim 20, wherein:
a software component in the one or more software components can be implemented in one or more of the following programming languages: C, C++, Visual Basic, Java and Java Applet.

27. The system according to claim 20, wherein:
a display property in the one or more display properties of the display component can be associated with one of: a text font, a font size, a text color, a display width, height, and resolution of the display component.

28. The system according to claim 20, wherein:
an input device in the one or more input devices can be one of: a keyboard, a mouse, and a stylus.

29. The system according to claim 20, wherein:
a freeform annotation in the one or more freeform annotations can be one or more of: strokes, gestures and handwritings of any shape.

30. The system according to claim 20, wherein:
the display component is further capable of:
   utilizing the control of the Microsoft Internet Explorer; and
   accessing the Document Object Model to obtain a bounding box of the digital document.

31. The system according to claim 20, wherein:
the display component is further capable of reserving an area on the display component for the input of the one or more freeform annotations.

32. The system according to claim 20, wherein:
the processing component is further capable of:
   managing one or more annotation marks on the displayed portion of the digital document by performing at least one of: creating, selecting, modifying, moving, deleting, rendering, and displaying an annotation mark of the one or more annotation marks on the display component based on the one or more display properties of the display component.

33. The system according to claim 32, wherein:
an annotation mark in the one or more annotation marks can be one of:
   an anchor capable of associating with a part of the portion of the digital document;
   a link capable of connecting at least two anchors; and
   a comment capable of associating with either an anchor or a connector.

34. The system according to claim 33, wherein:
the anchor can be one of: an underline, a highlight, a circled word, a circled area, a bracket, and a margin bar; and
the link can be one of: an arrow, and a connector.

35. The system according to claim 32, wherein:
the storage component is further capable of maintaining the one or more annotation marks.

36. The system according to claim 32, wherein:
the processing component is further capable of performing at least one of: selecting, moving, modifying, and deleting the annotation mark, via tapping, holding, and lifting an input device in the one or more input devices on the annotation mark.

37. The system according to claim 32, wherein:
the processing component is further capable of rendering the annotation mark via at least one of:
   retrieving a bounding box of the annotation mark;
   resizing and/or splitting the annotation mark; and
   repositioning the annotation mark on the portion of the digital document under display.

38. The system according to claim 33, wherein:
the processing component is further capable of rendering the comment by:
reserving an area on the screen for the rendering of the comment; and/or
resizing and/or repositioning the comment based on one of the one or more display properties.

39. The system according to claim 33, wherein:
the processing component is further capable of identifying the start of the comment by recognizing a freeform annotation in the one or more freeform annotations, wherein the freeform annotation is capable of:
   staffing on a blank area on the digital document under display; and/or
   not intersecting with any word or image on the digital document.

40. The system according to claim 33, wherein:
the processing component is further capable of identifying the finish of the comment by recognizing a freeform annotation in the one or more freeform annotations, wherein the freeform annotation can be one of:
   a click on a predefined area on the screen, which can be a button;
   a circular gesture around the comment;
   a strike-through gesture on the comment;
   a stroke bouncing off from the bottom of the screen;
   a special gesture that is rare in common handwriting; and
   a vertical stroke drawn on the left or right of the comment.

41. A machine readable medium having instructions stored thereon that when executed by a processor cause a system to:
   read and display a portion of a digital document on a screen based on one or more display properties of the screen;
   accept one or more freeform annotations on the displayed portion of the digital document via one or more input devices;
   categorize the one or more freeform annotations, wherein the categorizing is based on one or more of anchor types, comment types and connector types where the anchor types, comment types and connector types are selected from a predetermined set of anchor types, comment types and connector types and indicate to a user the category of the one or more free-form annotations;
   (a) wherein the processor first processes a freeform annotations as a first anchor type, wherein the first anchor type intersects a word or an image in the digital document;
   (b) wherein the processor next processes a freeform annotations as a second anchor type or a comment type, wherein the second anchor type intersects a word or an image in the digital document and wherein the comment type does not intersect a word or an image in the digital document;

(c) wherein the processor thereafter repeats step (b) unless a second anchor type is processed;

(d) wherein the processor thereafter processes freeform annotations as an anchor type or a comment type or a connector type, wherein the anchor type intersects a word or an image in the digital document, wherein the comment does not intersect a word or an image in the digital document; wherein the connector type connects two anchor types, wherein the first connector type connects the first anchor type and the second anchor type; and.

42. The machine readable medium of claim 41, wherein: the instructions can be embedded and executed on one or more computing devices, wherein a computing device in the one or more computing devices can be one of: a PDA, a Tablet PC, a Pocket PC, a cell phone, an electronic messaging device, a Java-enabled device, a laptop or desktop PC, a workstation, and a mainframe computer.

43. The machine readable medium of claim 41, wherein: the instructions can be implemented in one or more of the following programming languages: C, C++, Visual Basic, Java and Java Applet.

44. The machine readable medium of claim 41, wherein: the digital document can include at least one of: a text file, an image, a figure, a drawing, a graph, a picture, and a video clip.

45. The machine readable medium of claim 41, wherein: a display property in the one or more display properties of the screen can be associated with one of: a text font, a font size, a text color, a display width, height, and resolution of the screen.

46. The machine readable medium of claim 41, wherein: a freeform annotation in the one or more freeform annotations can be one or more of: strokes, gestures and handwritings of any shape.

47. The machine readable medium of claim 41, wherein: an input device in the one or more input devices can be one of: a keyboard, a mouse, and a stylus.

48. The machine readable medium of claim 41, further comprising instructions that when executed cause the system to:
store the digital document in memory and/or in a persistent storage.

49. The machine readable medium of claim 41, further comprising instructions that when executed cause the system to:
utilize the control of the Microsoft Internet Explorer to read the digital document; and
access the Document Object Model to obtain the one or more display properties.

50. The machine readable medium of claim 41, further comprising instructions that when executed cause the system to:
reserve an area on the screen for the input of the one or more freeform annotations.

51. The machine readable medium of claim 41, further comprising instructions that when executed cause the system to:
manage one or more annotation marks on the displayed portion of the digital document by performing at least one of: creating, selecting, modifying, moving, deleting, rendering, and displaying an annotation mark of the one or more annotation marks on the screen based on the one or more display properties of the screen.

52. The machine readable medium of claim 51, wherein: an annotation mark in the one or more annotation marks can be one of:
an anchor capable of associating with the portion of the digital document;
a link capable of connecting at least two anchors; and
a comment capable of associating with either an anchor or a connector.

53. The machine readable medium of claim 52, wherein: the anchor can be one of: an underline, a highlight, a circled word, a circled area, a bracket, and a margin bar; and
the link can be one of: an arrow, and a connector.

54. The machine readable medium of claim 51, further comprising instructions that when executed cause the system to:
store the one or more annotation marks in memory and/or in a persistent storage.

55. The machine readable medium of claim 51, further comprising instructions that when executed cause the system to:
perform at least one of: selecting, moving, modifying, and deleting the annotation mark via tapping, holding, and lifting an input device in the one or more input devices on the annotation mark.

56. The machine readable medium of claim 51, further comprising instructions that when executed cause the system to:
render the annotation mark via at least one of:
retrieving a bounding box of the annotation mark;
resizing and/or splitting the annotation mark; and
repositioning the annotation mark on the portion of the digital document under display.

57. The machine readable medium of claim 52, further comprising instructions that when executed cause the system to:
reserve an area on the screen for the rendering of the comment; and/or
resize and/or reposition the comment based on one of the one or more display properties.

58. The machine readable medium of claim 52, further comprising instructions that when executed cause the system to:
identify the start of the comment by recognizing a freeform annotation in the one or more freeform annotations, wherein the freeform annotation is capable of:
starting on a blank area on the digital document under display; and/or
not intersecting with any word or image on the digital document.

59. The machine readable medium of claim 52, further comprising instructions that when executed cause the system to:
identify the finish of the comment by recognizing a freeform annotation in the one or more freeform annotations, wherein the freeform annotation can be one of:
a click on a predefined area on the screen, which can be a button;
a circular gesture around the comment;
a strike-through gesture on the comment;
a stroke bouncing off from the bottom of the screen;
a special gesture that is rare in common handwriting; and
a vertical stroke drawn on the left or right of the comment.

60. A system for managing versions of a software component, comprising:
- means for reading and displaying a portion of a digital document on a screen based on one or more display properties of the screen;
- means for accepting one or more categorized annotations of the one or more freeform annotations on the displayed portion of the digital document based on one or more of anchor types, comment types and connector types where the anchor types, comment types and connector types are selected from a predetermined set of anchor types, comment types and connector types via one or more input devices; and
- means for processing the one or more freeform annotations based on the one or more categorized annotations via a completely deterministic state machine.

* * * * *